US008622336B2

(12) United States Patent
Brenner et al.

(10) Patent No.: US 8,622,336 B2
(45) Date of Patent: Jan. 7, 2014

(54) STABILIZER

(75) Inventors: Hanno Brenner, Braunschweig (DE);
Christoph Kessler, Braunschweig (DE);
Wolfgang Kreitmair-Steck, Ottobrunn (DE)

(73) Assignees: Deutsches Zentrum fuer Luft- und Raumfahrt e.V., Cologne (DE);
Eurocopter Deutschland GmbH, Munich (DE)

( * ) Notice: Subject to any disclaimer, the term of this patent is extended or adjusted under 35 U.S.C. 154(b) by 170 days.

(21) Appl. No.: 13/150,790

(22) Filed: Jun. 1, 2011

(65) Prior Publication Data

US 2011/0303783 A1 Dec. 15, 2011

(30) Foreign Application Priority Data

Jun. 9, 2010 (DE) .......................... 10 2010 023 228

(51) Int. Cl.
*B64C 11/00* (2006.01)

(52) U.S. Cl.
USPC ........................ 244/17.13; 244/137.1; 701/3

(58) Field of Classification Search
USPC ................... 244/17.13, 137.1, 137.4
See application file for complete search history.

(56) References Cited

U.S. PATENT DOCUMENTS

| 2,873,075 | A | * | 2/1959 | Mooers et al. | 244/17.13 |
|---|---|---|---|---|---|
| 2,998,210 | A | * | 8/1961 | Carter, Jr. | 244/177 |
| 3,756,543 | A | * | 9/1973 | Fowler et al. | 244/177 |
| 3,833,189 | A | * | 9/1974 | Fowler et al. | 244/177 |
| 3,904,156 | A | * | 9/1975 | Smith | 244/118.1 |
| 4,127,245 | A | * | 11/1978 | Tefft et al. | 244/17.13 |
| 4,741,501 | A | * | 5/1988 | Clelford et al. | 244/17.13 |
| 6,533,220 | B2 | * | 3/2003 | Schuster | 244/118.1 |
| 7,331,477 | B2 | * | 2/2008 | Schulte et al. | 212/270 |
| 7,633,383 | B2 | * | 12/2009 | Dunsmoir et al. | 340/435 |
| 7,777,718 | B2 | * | 8/2010 | Franko et al. | 345/156 |
| 7,954,766 | B2 | * | 6/2011 | Brainard et al. | 244/194 |
| 8,162,264 | B2 | * | 4/2012 | Certain | 244/137.4 |
| 8,190,307 | B2 | * | 5/2012 | Omar | 701/4 |
| 2005/0242239 | A1 | * | 11/2005 | Scott | 244/137.4 |
| 2009/0146010 | A1 | * | 6/2009 | Cohen | 244/137.1 |
| 2010/0025524 | A1 | * | 2/2010 | Doversberger | 244/17.13 |

FOREIGN PATENT DOCUMENTS

| DE | 2244938 | 9/1972 |
|---|---|---|
| DE | 2233938 | 11/1972 |
| DE | 10 2005 022 212 | 11/2006 |
| DE | 10 2005 022 231 | 11/2006 |
| DE | 20 2006 009 330 | 11/2006 |
| DE | 20 2008 025 298 | 12/2009 |

* cited by examiner

*Primary Examiner* — Christopher P Ellis
*Assistant Examiner* — Medhat Badawi
(74) *Attorney, Agent, or Firm* — Whitham, Curtis, Christofferson & Cook, P.C.

(57) ABSTRACT

A rotary aircraft which carries a hanging sling load on at least one support cable, benefits from a stabilizer which generates control signals R to be applied or modulated onto the flight control of the aircraft. At least one sling load pendulum motion detecting unit provides the stabilizer with data on the pendulum motion of the sling load. Additionally, the stabilizer is set up with a working range determination unit S3 for determining the space where free movement is possible in which the rotary aircraft with sling load can move without collision. The stabilizer generates control signals R in dependency of the determined pendulum motion of the sling load and the determined working range.

8 Claims, 4 Drawing Sheets

STABILIZER

FIELD OF THE INVENTION

The invention relates to a stabilizer for rotary wing aircraft which carry a hanging sling load in the direction of the ground on at least one support cable, and were the stabilizer is set up to generate control signals to be applied or modulated onto the flight control of the rotorcraft and set up with at least one sling load pendulum motion detecting unit for detecting the pendulum motion of the sling load.

BACKGROUND

Rotary wing aircraft, especially helicopters, are distinguished, among other vehicles, by their ability to lift and transport heavy loads to locations that are not easily accessible by conventional means. A special type of transport in this case constitutes the sling load transport where the load is fastened by means of a supporting cable or wire harness support in the form of a net attached to one or more hooks on the helicopter or on an external winch. However, the attaching of a sling load to a helicopter changes the system dynamics and degrades the flight characteristics. Additionally, the flight control task of the pilot is increased as he also must control the sling load since the complexity to the flying entire system is increased by the sling load. This ultimately leads to increased stress for the pilot and generally causes a reduction in flight safety.

During sling load transport there is risk of uncontrollable, low-frequency pendulum motions as a result of aerodynamic interference or control inputs. The pendulum motion can turn into unstable pendulations which can also be provoked by pilot inputs. This can eventually lead to pendulations provoked by the pilot. The pilots can perceive the dynamic influence of a pendulating sling load from the helicopter, but usually they can't see the sling load, thus there is risk that in certain cases the corrective control inputs from the pilot to dampen the overall system do actually provoke the pendulum motion even further. The reason for this is that the pilot intuitively is trying to counteract the transverse force exerted on the helicopter caused by the pendulating sling load, instead of flying to a limited extent behind it in order to release the sling load of transverse forces. Heavy pendulations from the sling load endanger the entire system and its crew as their impact on the helicopter may lead to the fact that the helicopter can no longer be controlled.

STATE OF THE ART

For instance, from DE 10 2008 025 298 A1 a method and device is known for attenuation of vertical swingings in a helicopter with an attached sling load where vibration sensors on the helicopter detect the excitation of at least two eigenmodes of the vertical swingings. In contrast to the vertical swingings, as a function of the phases and amplitudes, the detected excitations are initiated between the load-take-up-point and the whippletree (gear for loads) with an active controlled linear actuator. This active controlled linear actuator, directly acting on the rope harness attenuation system, has no direct effect on regulation of the attitude of the helicopter, but is directed towards only the attenuation of the coupling of the cable harness and sling load on the helicopter.

From DE 22 44 938 C3, U.S. Pat. No. 3,833,189 A and U.S. Pat. No. 3,756,543 A load stabilization systems are disclosed were the pendulating movements of the sling load are measured. The rate of change of the angle between the rope and the vertical of the helicopter and their filtered rates are directed as control variables in the controller, resulting in a retroactive stabilization system for the flight control of the helicopter.

For passive support of the pilot during a sling load transport, for instance, from DE 10 2005 022 231 A1 and DE 10 2005 022 212 A1 a method and device is revealed for representing the position and state of motion of a load hanging from a helicopter. For this purpose a sensor attached to the sling load measures the current position of the sling load, and in case of heavy load swings visual control instructions are displayed to the pilot. If the pilot follows the control instruction in the display it leads to the stabilization of the sling load. However, this system does not perform automatic pendulation attenuation, so that it ultimately is up to the pilot whether to follow the proposed control instructions.

The problem for the pilot remains, as he does not have direct visual contact to the load hanging below the helicopter, this can lead to an unstable attitude due to pendulating movements of the sling load while the pilot is performing compensation maneuvers. For precise positioning tasks in a situation of difficult to see obstacles at below a helicopter near the ground there is also the risk that the sling load or helicopter might collide with such an obstacle and crash while the pilot is performing compensating movements. The higher the stress on the pilot the more likely he is to make mistakes in controlling the helicopter so it increases the potential risk.

SUMMARY

Task

Accordingly, it is the object of the invention currently under consideration to provide a stabilizing device for rotorcraft with which an automatic compensation movement can be performed safely in such a situation of obstacles near the ground which require precise positioning to attenuate the pendulating movements of the sling load.

Solution

The task is solved with the aforementioned stabilization device according to the invention by the fact that the stabilization device is equipped with a working range determination unit for determining the space where free movement is possible in which a rotorcraft with sling load can move without collision and the stabilization device is set up to generate the control signals in dependency of the determined pendulum motion of the sling load and in dependency of the of the determined working range.

Therefore, the invention currently under consideration proposes that in addition to detecting pendulation and swing movements of the sling load and execution of counteractive flight movements in dependency of such movements, that the possible free movement space should be determined as well within which the rotorcraft can move including the sling load without colliding with any obstacles. The evasive movements, with which the respective swings in the sling load will be attenuated, will now not only be carried out in dependency of the pendulum motion of the sling load, but also in dependency of the freely usable space where the helicopter can move without collision. Thus, for instance, it can be avoided, that in a situation of obstacles near the ground where the possible motion-free space is very limiting, automatic flight maneuvers are performed in order to attenuate the pendulum motion of the sling load which then would lead to a collision with barriers within the nearby surrounding of the helicopter.

Thus, the fully automatic pendulation attenuation control within a situation of obstacles near the ground includes a situation and environment adjusted control of the helicopter in order to avoid a swinging up of the sling load and to avoid collisions with obstacles.

For instance, it was recognized that a respective evasive movement for the purpose of swinging damping of the sling load can also be performed in vertical direction to get more free space for possible horizontal countermovement. For this purpose, a horizontal evasive movement is always preferable to a vertical evasive movement, since a horizontal evasive movement requires less power; however, this might be necessary as a first action in order to gain the appropriate space for a horizontal evasive movement and to achieve the primary objective which is the avoidance of a collision with obstacles.

Furthermore, it was recognized that a rapid and sustained stabilization is still possible, at all times, even if the pendulum motion was also provoked by the pilot due to incorrect control inputs. It is also conceivable that the invention currently under consideration, i.e. the stabilizing device initially moves, after detecting a pendulum motion, the helicopter in one direction which excites the pendulum motion even more, but which moves the helicopter into a possible free space for evasive movements where quickly and sustainably a damping of the pendulum motion can be initiated. Thus, the stabilizing device initially and automatically performs a flight maneuver which is contrary to the actual goal to dampen the pendulum motion to avoid collision with obstacles, and the actual compensation movement is performed thereafter in a free working range.

Preferably, the pendulum detecting unit provided for detecting the pendulum motion of the sling load is set up such that it can detect a pendulum motion in lateral and longitudinal direction relative to the longitudinal axis of the helicopter. For instance, this can be accomplished with a pendulum detection unit already known from current state of the art. For example, from DE 20 2010 002 309 a pendulum detection unit is known where at the top of the sling load a mark is placed and at the bottom of the helicopter a corresponding camera with an image processing unit which continuously captures the sling load along with its marking and based on the marking can detect a pendulum motion of the sling load.

To determine the possible free working range within which the helicopter can move with its sling load without colliding with obstacles, it is feasible to use appropriate sensors such as radar sensors, image sensors and camera sensors with image processing units which record or scan continuously the environment of the helicopter in order to represent a complete image of the environment and to detect all obstacles within it. Thus, depending of the recorded and detected environment a free working range can be determined for the helicopter.

In this case, it would be extremely advantageous if certain obstacles such as trees, poles etc could be detected by the sensors as these type of obstacles limit the working range considerably.

Moreover, it is conceivable that in order to determine the possible free working range with a digital card using the geodata stored within it to determine the free working range.

For instance, such geodata could be terrain height information or information regarding forestation and such a digital map alone or additionally the aforementioned sensors could be deployed. The position of obstacles such as tall buildings can also be mapped by the information in the digital map.

Thus, it is ultimately possible to determine with the working range determination unit the extent of three-dimensional space within which the rotorcraft with the sling load can move without colliding with obstacles. Obstacles or respective natural objects, like rocks or mountains, do limit the potential free working range so that the freedom of movement of the helicopter is restricted.

Preferably, the control signals are modulated (applied to) onto the control signals for flight control of the rotorcraft for the purpose of damping of the pendulum motion in order to counteract a swinging up or provoking of the pendulum motion of the sling load. This can be done, for instance, in that the stabilization device is integrated as an additional component in the flight control unit in such a way that, in addition to the other control commands, for example, from the pilot, the control signals generated from the stabilization device are taken into account or considered so as to achieve a damping of the pendulum motion free of any collision.

In addition, it is particularly advantageous if the stabilization device generates the control signals depending on the current position and/or ground speed of the rotorcraft.

Furthermore, the length of the support cable and the size of the sling load can be used advantageously as the basis for calculating the control signals which are then modulated (applied to) the control signals for flight control.

DESCRIPTION OF THE DRAWINGS

The invention is illustrated exemplary in the accompanying drawings.

The following is depicted.

DETAILED DESCRIPTION

Figure 1:
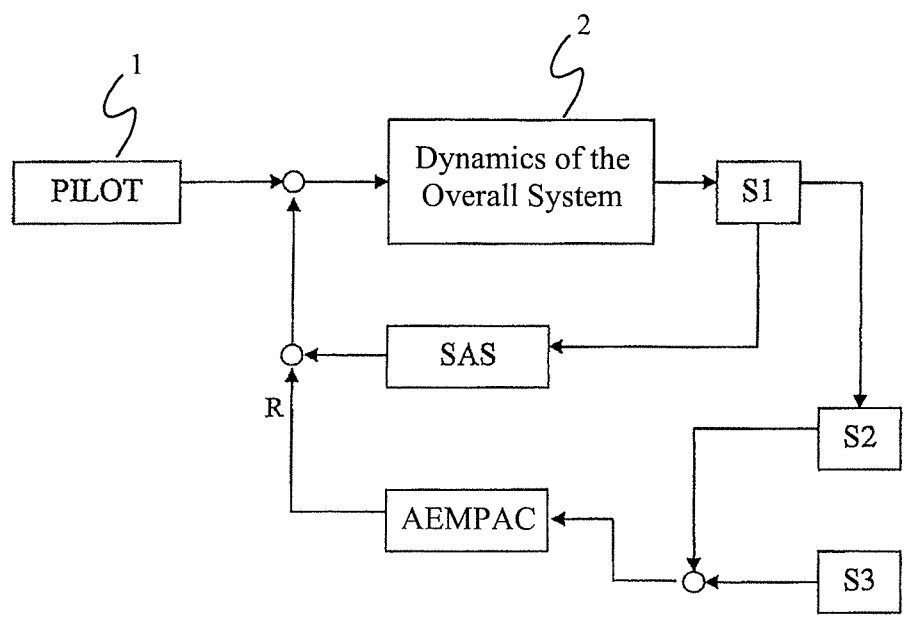
FIG. 1 Sketch of an integrated stabilizer.

FIG. 1 shows the sketch of an integrated stabilizer where the pilot 1 influences with respective control commands the dynamics of the overall system 2. These dynamics of the overall system 2 can be detected using an inertial navigation system S1. Such an inertial navigation system, for instance, determines the position of the helicopter, its flight speed over the ground, its longitudinal movements and corresponding moments of inertia. From all this exemplary recorded data the dynamics of the overall system 2 can be determined. The information derived from the inertial navigation system S1 about the dynamics of the system are then forwarded to the Stability Augmentation System SAS to create the basic stability of the helicopter which in turn generates appropriate control signals that are modulated or applied to the control signals of the pilot 1 and thus ensure the basic stability of the helicopter.

According to the invention the data derived from the inertial navigation system S1 is forwarded to a sling load pendulum motion detecting unit S2. Such a sling load pendulum motion detecting unit S2, for instance, can consist of a camera and a marker attached to the sling load so that depending on the movement of the marker which can be detected by an image capturing unit a pendulum motion of the sling load can be calculated. From the data of the inertial navigation system S1 the dynamics of the whole system S2 can be determined as a function of the pendulum motion of the sling load. Furthermore, there is working range determination unit S3 which can determine the obstacle-free working range in which the rotorcraft can move with its sling load without collision with obstacles. This data originates from the sling load pendulum motion detecting unit S2 and the working range determination unit S3 which is forwarded to the automatic evasive movement and pendulation attenuation control AEMPAC which then generates a corresponding control signal as a function of its input data which in turn are modulated or applied to the control signals of the normal flight control of the helicopter and the pilot 1. As a result, the dynamics of the overall system 2 is stabilized accordingly, without any maneuvers by the pilot. Thus, even within a similar situation of obstacles near the ground an automatic damping control can be performed which assists the pilot additionally in difficult sling load transports.

Figure 2:
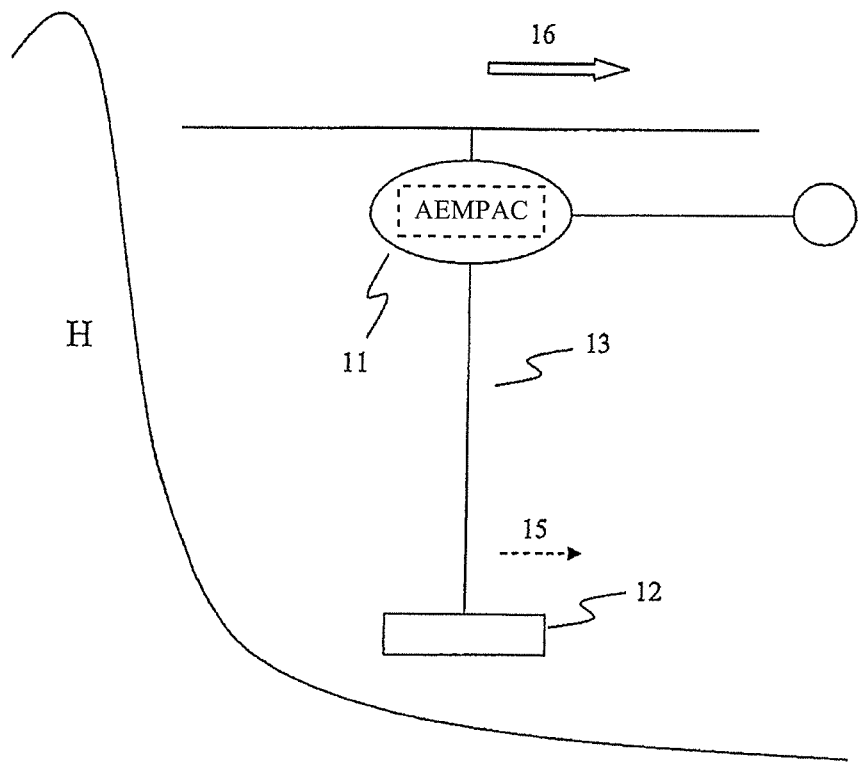
FIG. 2 schematic representation of an obstacle-free motion compensation.

FIG. 2 show a schematic representation of an obstacle-free evasive movement. On a helicopter 11 a sling load 12 is hanging for the purpose of transportation from a support cable 13. The helicopter 11 is shown with an automatic evasive and pendulation attenuation control AEMPAC which is connected to a sling load pendulum motion detecting unit S2 and a working range determination unit S3.

In the embodiment of FIG. 2 the sling load 12 is shown with a pendulum motion in the direction of the arrow 15, i.e. from the perspective of the helicopter 11 to the rear which can lead to the instability of the attitude. In order to compensate for the pendulum motion in the direction of the arrow 15 the pilot would have to steer the helicopter in the direction of the pendulum movement 15 so as to compensate for this swing and to release the sling load from lateral forces. In the case currently under consideration this is taken over by the inventive stabilizer. For this purpose the sling load pendulum motion detecting unit S2 detects as a first action the pendulum motion 15 of the sling load 12 and transmits this fact to the automatic evasive and pendulation attenuation control AEMPAC. Additionally, the working range determination unit S3 has detected that the working range in front is blocked by a barrier H while it is free towards the back. Accordingly, an appropriate evasive movement can occur, indicated by arrow 16. Thus, an appropriate control signal is generated by the automatic evasive and pendulation attenuation control AEMPAC which will be introduced or applied to the control signals for flight control of the rotorcraft so that an appropriate evasive movement 16 is performed for damping the pendulum motion 15 of the sling load 12.

Figure 3:
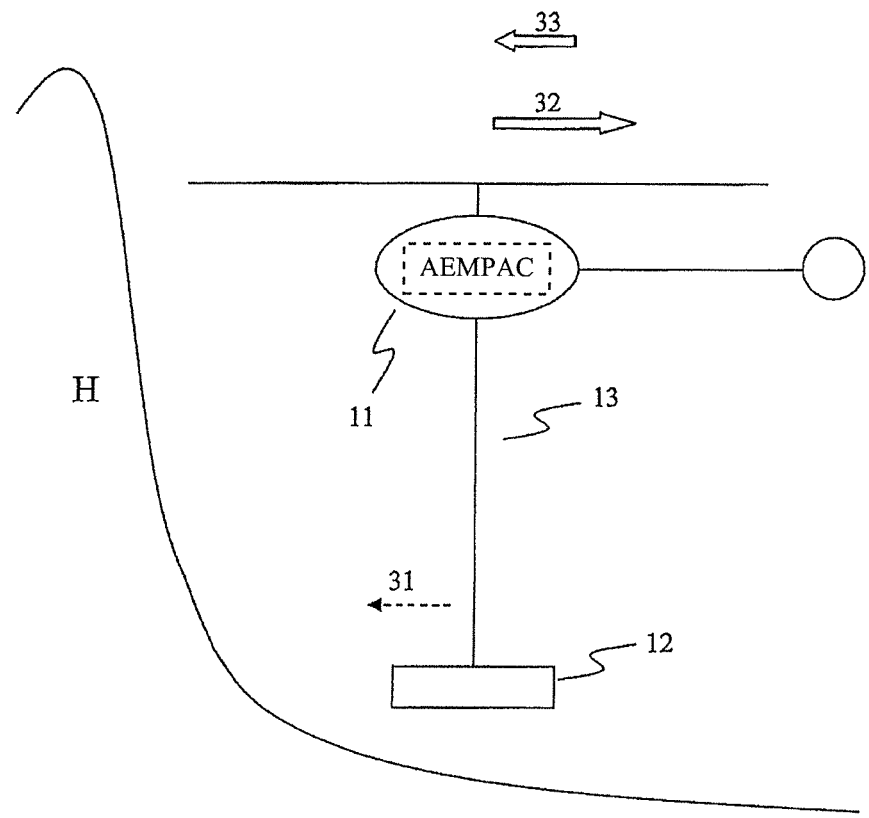
FIG. 3 schematic representation of a collision-avoiding horizontal evasive movement.

FIG. 3 shows the schematic representation of a collision-avoiding horizontal evasive movement. As in the previous embodiment a sling load 12 is attached with a support cable 13 below the rotary wing aircraft 11. The sling load 12 now swings in direction 31, i.e. in direction of the barrier H. To compensate for this pendulum motion 31 it would require an evasive movement in the direction of the barrier H, but this would without doubt either lead to a collision with the sling load 12 and the obstacle or a collision with the helicopter 11 and the obstacle. For this reason an automatic evasive movement in the swing direction 31 would be extremely dangerous.

With assistance of the working range determination unit S3 it has been recognized that there is an obstacle in the direction towards which an evasive movement would have to take place. Furthermore, it has been recognized that the space behind the helicopter 11, i.e. at the opposite side of the barrier H, that there is unobstructed space.

From this information, the working range determination unit S3 now determines the respective unobstructed working range in which an evasive movement can take place without collision with obstacles. The automatic evasive and pendulation attenuation control AEMPAC is for this case set up in such a way to initially execute an evasive movement 32 in order to bring the helicopter 11 in a position where an evasive movement can be performed without collision. However, this evasive movement 32 is carried out in a direction opposite to the direction of pendulum direction 31 which provokes the pendulum motion of the sling load 12 even more. After the complete system, consisting of helicopter 11 and sling load 12, is in a collision-free environment the evasive and damping motion 33 will be carried out which in turn is carried out in swing direction 31, i.e. in direction of the obstacle. Since the helicopter 11 is now at a greater distance to the obstacle the corresponding evasive movement 33 can now be carried out without colliding with the barrier H.

It was recognized that a rapid and sustained stabilization, even from heavily provoked pendulations, is possible at any time so that in case of the embodiment of FIG. 3 a further provoking of the pendulum motion initially is acceptable in order to achieve the primary goal of preventing a collision with the obstacle H. Only when the helicopter 11 is in a collision-free environment the evasive movement 33 for damping will be carried out.

Figure 4:
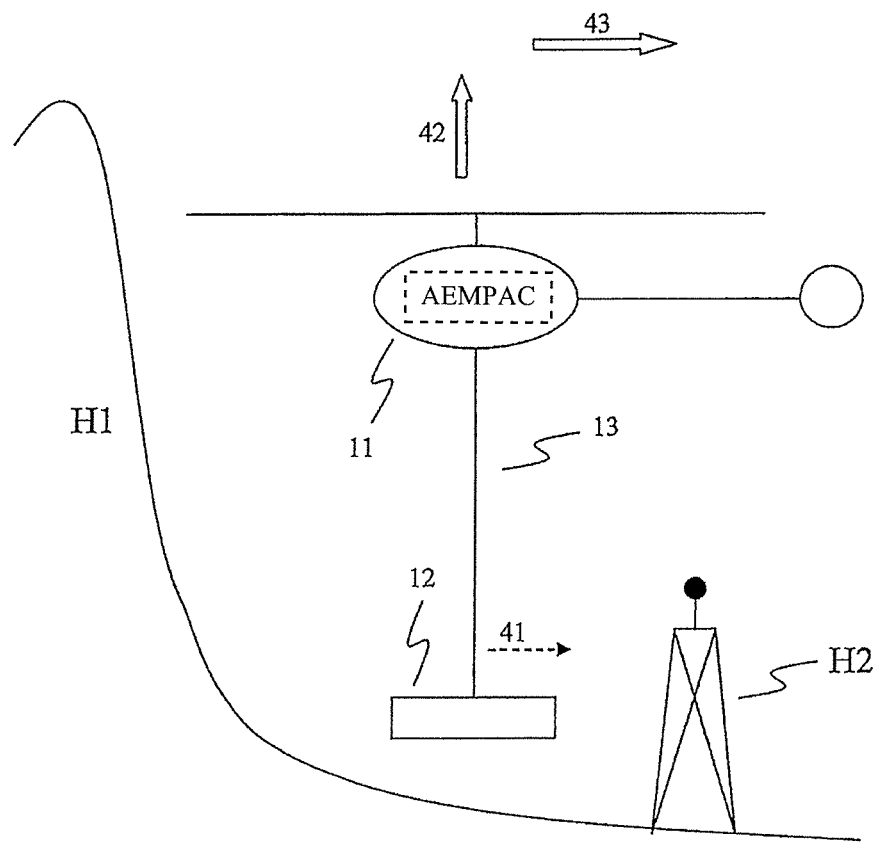
FIG. 4 schematic representation of a collision-avoiding vertical evasive movement.

FIG. 4 shows the schematic representation of a collision-avoiding vertical/horizontal evasive movement. As already covered in the aforementioned embodiments of FIGS. 2 and 3 a sling load 12 is hanging on a support cable 13 from a helicopter 11. There is a rock in flight direction, obstacle H1, and in the reverse direction of the flight direction there is a radio mast, obstacle H2, the sling load 12 is currently located between the two barriers H1 and H2.

A pendulum motion 41 of the sling load 12 provoked by, for instance, a gust of wind in the direction towards obstacle H2, actually would require an evasive movement in precisely this direction to dampen the pendulum motion. However, this is in this case not possible because the sling load 12 would otherwise collide with obstacle H2. Also, a first evasive movement in forward direction is not possible, since otherwise the helicopter 11 would collide with the obstacle H1. The working range which was determined by the working range determination unit S3 is very limited, both in flight direction and in the opposite direction of flight, so that there is no free space in which an evasive movement can be performed.

In this embodiment, the only option is to initially provide free space by a vertical movement. Therefore, first a control signal is applied by the stabilization device onto the control signals for flight control such that an evasive movement in the direction 42, i.e. upwards can be carried out. This dampens only to a certain extent the pendulum motion 41, however, it provides the necessary space for the helicopter 11, in order to carry out an appropriate evasive movement in the direction 43, i.e. in swing direction, after a certain altitude has been reached, in order to dampen the pendulum motion of the sling load 12. Without a corresponding vertical evasive movement 42 it would inevitably result in a collision or unstable flight characteristics. Through the initially conducted upward motion the usable space is expanded for stabilization.

The aforementioned embodiments should be regarded only as examples. Moreover, other combinations of obstacles and swing or pendulation states of the sling load are conceivable which can serve as input for the stabilizer and which would result in appropriate evasive or compensation movements. For instance, a different scenario could require a lowering movement as an initial flight control to avoid a collision during the evasive movement.

The invention claimed is:
1. Stabilizer for rotorcraft which carry one hanging sling load on at least one supporting cable: comprising:
at least one sling load pendulum motion detecting unit (S2) for detecting pendulum motion of the sling load; and a working range determination unit (S3) to determine a free working range in which the rotorcraft with sling load can move without collision, and wherein the stabilizer generates the control signals (R) in dependency of a detected pendulum motion of the sling load and in dependency of a determined working range, and wherein the sling load pendulum motion detecting unit (S2) for detects the pendulum motion of the sling load in a lateral and a longitudinal direction in relation to a longitudinal axis of the rotorcraft wherein the stabilizer generates control signals (R) which are applied or modulated onto flight control signals of the rotorcraft for damping pendulum motion of the sling load.

2. Stabilizer according to claim 1, further comprising:

at least one sensor to determine an environment of rotorcraft, and wherein the working range determination unit (S3) determines a movement space as a function of the detected environment.

3. Stabilizer according to claim 2, wherein the at least one sensor detects obstacles (H1, H2) in the environment, and wherein the working range determination unit (S3) determines the movement space as a function of the detected obstacles (H1, H2).

4. Stabilizer according to claim 1, wherein the working range determination unit (S3) stores a digital map and determines a movement space as a function of information from the digital map.

5. Stabilizer according to claim 1, wherein said control signals (R) are generated as a function of at least one of current position and speed above ground of the rotorcraft.

6. Stabilizer according to claim 1, wherein said control signals (R) are generated as a function of at least one of a length of the supporting cable and size of the sling load.

7. Stabilizer according to claim 1, wherein said control signals (R) achieve at least one of a collision-free vertical and collision-free horizontal flight movement.

8. Stabilizer according to claim 1, wherein said control signals (R) initially cause a collision-free evasive movement before damping of the pendulation.

* * * * *